Aug. 23, 1966    D. B. PALL ETAL    3,268,442
PROCESS FOR SEPARATING IMMISCIBLE LIQUIDS AND APPARATUS
Filed May 8, 1964    3 Sheets-Sheet 1

INVENTORS.
DAVID B. PALL,
SIDNEY KRAKAUER,
BY CHESTERFIELD FRANKLIN SEIBERT,
MARCEL G. VERRANDO, &
CYRIL A. KEEDWELL

Watson, Leavenworth + Kelton
ATTORNEYS

INVENTORS.
DAVID B. PALL,
SIDNEY KRAKAUER,
CHESTERFIELD FRANKLIN SEIBERT,
BY MARCEL G. VERRANDO, JR. &
CYRIL A. KEEDWELL

Watson, Leavenworth + Kelton
ATTORNEYS

INVENTORS.
DAVID B. PALL,
SIDNEY KRAKAUER,
CHESTERFIELD FRANKLIN SEIBERT
BY MARCEL G. VERRANDO, JR. &
CYRIL A. KEEDWELL

Watson, Leavenworth & Kelton
ATTORNEYS

# United States Patent Office 3,268,442
Patented August 23, 1966

3,268,442
PROCESS FOR SEPARATING IMMISCIBLE LIQUIDS AND APPARATUS
David B. Pall, Roslyn Estates, N.Y., Sidney Krakauer, Mountaintop, Pa., and Chesterfield Franklin Seibert and Marcel G. Verrando, Cortland, and Cyril A. Keedwell, Jericho, N.Y., assignors to Pall Corporation, Glen Cove, N.Y., a corporation of New York
Filed May 8, 1964, Ser. No. 369,051
9 Claims. (Cl. 210—23)

This application is a continuation-in-part of U.S. application Serial No. 29,745, filed May 17, 1960 now abandoned.

This invention relates to a process for coalescing and separating droplets of a liquid suspended in another liquid in which they are immiscible, and to apparatus for use in carrying out these purposes.

Most fuels in use today contain a surprisingly large quantity of water which may have entered the fuel for any of a number of reasons. This water does not ordinarily present a problem while it remains dissolved in the fuel. If the fuel is used at a temperature lower than its storage temperature, water is expelled from solution, and may give trouble if its does not settle out. Some engines become quite balky if water droplets are present in the fuel. If the fuel is used under conditions such that the water freezes, there is always the possibility that ice will block a fuel line or other vital part, with resultant malfunctioning or nonfunctioning of the system. This can be quite serious, particularly in aircraft and missiles operated at high altitudes.

Gasoline fuels present less of a problem than kerosene fuels, apparently because isooctane is not capable of dissolving as much water as kerosene, and therefore not as much water is expelled upon cooling. Furthermore, gasoline is used at a slower rate than is kerosene, so that the water has a longer time to settle out, and the water is not passed through the system in large quantities. Also, water forms a less stable emulsion in isooctane than in kerosene, and the emulsion has a lower viscosity. The kerosene base fuels not only present the most serious problem, but also are the fuels in widest use today for turbine and jet aircraft and missiles.

The aircraft industry and defense authorities have spent considerable time and effort in recent years in the development of efficient fuel-water separators. Such systems employ various techniques for removal of water, including filter elements of the depth type. No system yet presented, however, is fully effective. The filter elements in use have had a very short life, in addition to incompletely removing the suspended water.

In accordance with the invention, water suspended in fuel, and other liquids suspended in liquids in which they are wholly or partially immiscible, are removed by coalescing the droplets by forcing them through a small passage whose diameter is substantially less than the diameter of the suspended droplets. The passages are arranged in what is called herein a coalescer, to be described more fully later.

The passage can be of any configuration, for example, a single straight-through conduit, or a tortuous many-forked passage formed by the interconnected interstices in a mass of fibers. The configuration and length of the passage are not important, but the diameter relative to the diameter of the droplets is critical. Preferably, the passage is less than ⅔ down to about ⅒₀ the diameter of the smallest droplets suspended in the fluid being treated, and in any event less than ⅘ the average diameter of the suspended droplets. The passage can have a greater diameter over part of its length provided it at some point has such a minimum diameter. Preferably, the minimum diameter of the passage is at the entrance thereto, or adjacent the entrance.

The droplets which emerge on the other side of the passage desirably are large enough to separate from the fuel or other liquid by gravity. If they are not, they can be passed through another coalescer whose passages are larger in diameter than the first, but still smaller than the diameter of the coalesced droplets. The coalescing process is then repeated.

In order to ensure complete separation of the coalesced droplets from the fuel or other liquid, the liquid is then passed through a noncoalescing filter or fluid permeable separator which absolutely prevents passage of coalesced droplets, but permits free passage of the suspending liquid, such as the fuel. The coalesced droplets are there separated out from the fuel or other liquid, and can be collected and removed.

It will be evident from the description that the process of the invention is effective for coalescing any type of droplets suspended not only in fuels but in any liquid in which they are immiscible.

The diameter of the coalescing passage is primarily determined by the suspended droplet size, and the surface tension thereof. It is important to block passage of droplets until after they have coalesced, and if their surface tension is low, this means that for droplets of the same initial size the diameter of the passage must be smaller than for a liquid of higher surface tension.

Since there are three variables to be controlled, it is hard to set parameters defining operative limits, but simple trial and error will establish these rather quickly for any liquid-liquid system. The limits for separation of water from gasoline or kerosene fuel will be given as illustrative.

Water droplets suspended in kerosene, isooctane and other fuels usually have a diameter of the order of 1 to 10 microns. In order to remove droplets of this size, the coalescer passages should have a diameter less than the droplets within the range from about 0.1 to about 5 microns.

From passages of this diameter coalesced water droplets will be obtained ranging from 50 to 100 microns in diameter. These can be separated from the fuel by separator passages ranging from 25 to 75 microns in diameter.

Surprisingly, the length of the coalescer passage is apparently of no significance. It can be negligible, i.e., 0.001 mm. or less, as in a thin sheet. A relatively long passage can prevent turbulence on the other side that would break up the coalesced droplets. To this end, it is beneficial to taper the passage so that it increases in diameter from the entrance thereto, so as to increase its volume and slow the rate of flow of the suspending fluid. It is not necessary that the passage be tapered so that the exit end is as large as the coalesced droplets, but this is advantageous. A similar slowing effect can be obtained by increasing the number of passages by branching passages off from the entering passage, as by passing the liquid from the inside to the outside of a cyclindrical fibrous coalescer; this can be in addition to or in lieu of a larger exit end of the passage.

If the droplets are small, the coalescer passages are very small in diameter. In this event, there is danger that the passages will become blocked by dirt or other debris which also may be suspended in the fuel or liquid. Such dirt is preferably removed by filtration before the fluid encounters the coalescer. Any conventional filter can be employed. The pore diameter thereof should be larger than that of the suspended droplets and certainly larger than that of the coalescer.

The process of the invention can be carried out by use of a wide variety of coalescer elements. Elements similar in type to the coalescer but of appropriate pore diameter can be used in the initial filtration stage, which is optional, as well as in the separator stage. However, a wider variety of elements are open for use in the filtration stage, than in the coalescing stage, because the pore diameter requirements are less stringent.

Depth type filters formed of masses or bats of unwoven fibers are preferred for all three stages. These give a higher dirt capacity in the filtration stage, and a better coalescence in the coalescing stage.

Any fibers not attacked by the liquids present and preferably incapable of absorbing either one can be employed, such as, for example, glass, quartz, nylon, Dacron (polymers of ethylene glycol and terephthalic acid), Orlon (polyacrylonitrile), regenerated cellulose, asbestos, polyvinyl chloride, polyvinylidene chloride, cellulose acetate, hydrophobic resin-impregnated cotton, and polytetarafluoroethylene.

The diameter of the fibers and the degree of compacting give control of the coalescing passage diameter. The smaller the fiber diameter, and the denser the compacting, the smaller the interstices between the fibers in the bat. Ordinarily, fiber diameters in the coalescer will be within the range from about 0.25 to about 5 microns, so as to give passages from 0.01 to 5 microns. The length of the fibers is in no way critical. The longer the fibers, the stronger the bat.

Bats of unwoven fibers do not have uniform or continuous passages therethrough as does, for example, a perforated plate. However, the interstices between the fibers effectively define interconnecting coalescing passages therethrough.

A bat formed of loose fibers is structurally quite weak, and has only a short life even when supported between porous supports such as a wire screen. The finer fibers are very difficult to keep within screens. If a screen fine enough to retain the fibers is used, the flow capacity is too greatly reduced.

Structural strength can be obtained by bonding the fibers with a synthetic resin. Phenol-formaldehyde resins, urea-formaldehyde resins, melamine-formaldehyde resins and epoxy resins are quite satisfactory bonding agents. The bonding technique is conventional, and need not be further described, except, of course, to note that the amount of resin is less than will reduce unduly the porosity of the bat. Just enough resin should be used to coat the fibers and ensure bonding at their points of contact. The amount is readily ascertained by simple calculation of the surface area of single fibers of any given diameter and length. From 3% to 25% resin by weight is adequate for 0.25 micron fibers.

A preferred method of making bats of the type which can be employed as coalescers in the process of the invention is to lay down a slurry of the fibers suspended in water of controlled pH on a cloth supported on the mesh of a Fourdrinier or paper making machine. A vacuum can be applied to condense the fibers to a mat on a cloth backing, which is then removed from the mesh screen support. This can be rolled up in spiral form on a mandrel. By controlling the tension during winding, the fibrous bat can be compacted or densified with the aid of the cloth backing to the passage diameter needed.

A bat particularly desirable for use as a coalescer is obtainable by interspersing diatomaceous earth throughout. This can effectively reduce the passage diameter to the diameter of the pores in the diatom skeletons, if enough diatomaceous earth is used. From 50 to 95% diatomaceous earth by weight, based on the volume of the fibers, is quite satisfactory. The diatomaceous earth is simply incorporated with the slurry of fibers at the time this is laid down to form the bat. A resin bnding agent can, if desired, be incorporated in the slurry. However, the resin bonding is not as essential in a spirally-wound fibrous bat laid down upon a cloth backing, and can be omitted, if desired.

Since small passages are not needed in the separator, no diatomaceous earth need be used in this element.

In order to obtain a coalescer element having several coalescing stages, the first stage passages being smallest and the last stage the greatest, the element can be formed as a cylindrical spirally-wound bat composed of two or more layers of differing density and diameter, so as to form the several coalescing stages desired, as suggested above. In the first and innermost coalescing stage there would be a fine fiber layer, in the second coalescing stage an intermediate coarser fiber layer, and finally, the outermost quite coarse fiber layer. The first stage has the smallest passage diameter, and the third the largest, because of the increasing fiber diameter in the three layers. If water-containing fuel is passed through such a bat, first through the innermost fine layer, and finally through the outermost coarsest layer, coalescence in three stages to quite large final droplets is obtained, and this without any danger that the coalesced droplets be broken up as they pass through, because of the increasing void volume as the liquid progresses to the outside of the cylinder.

The separator can be of the depth type, and similar to the coalescer element. The fibers used are somewhat coarser, ranging in diameter from 5 to 25 microns, so as to give passages ranging from 5 to 25 microns in diameter. However, it is essential that the passage diameter therethrough be so small that the coalesced droplets cannot enter them. If they do, the element will function as a coalescer, instead of as a separator. Preferably, the surface of the element is not to be wet by the coalesced droplets, so as to ensure that they will not cling to the surface, but can be separated readily therefrom before they can be forced through under the pressure of the liquid passing through. When the coalesced droplets are water, the surface of the separator can, for example, be coated with a silicone resin or with a halosilane, such as trimethyl silicon chloride, to prevent wetting.

Depth type separators are preferred, but other types of structures can be used, such as woven screens, perforated sheets, plural layers of bonded parallel fibers, laid in any pattern across each other and then bonded at their crossing points, sintered woven screens, sintered powders, and the like, all of which are regularly encountered in the filter art and will be familiar to anyone skilled in this art. These can be made of any of the materials named above for the fibers, and also including metals such as stainless steel, nickel, chromium, brass, and copper.

The surface configuration of the coalescer and separator is not critical, but will depend upon the flow requirements and space limitations. A considerably larger surface for a given space is obtainable by corrugating the element. Also, the apparatus can include a plurality of elements, in which event they desirably are cylindrical in shape.

The method and apparatus of the invention are further illustrated in the drawings, in which.

Figure 1:
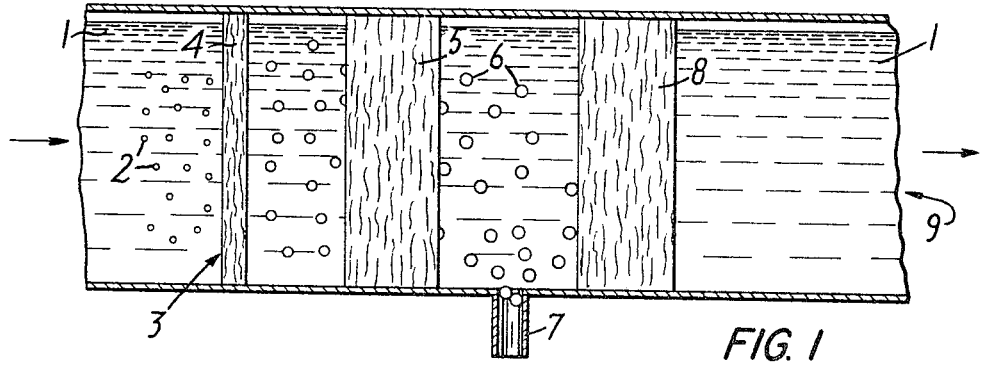
FIGURE 1 represents a simple form of apparatus for carrying out the several stages of the method of the invention, showing the filtration, coalescer and separator stage elements used therein.

As shown in FIGURE 1, a liquid such as fuel 1 containing droplets 2 of a second liquid suspended in it, such as water, enters the separator at 3, and passes through the depth type filter 4, where suspended dirt and other debris is removed. Next, the liquid passes to the coalescer 5, where small droplets collect on the surface and there coalesce to larger droplets which are forced through under fluid pressure and emerge on the other side as droplets 6 sufficiently large for the most part to be separated from the liquid by gravity. The separated droplets are drawn off through the bleed pipe 7. Such droplets as do not settle out at first as blocked when they encounter the surface of the separator 8, from which they drop by gravity into the bleed pipe. Droplet-free liquid such as fuel emerges from the system at 9.

Figure 2:
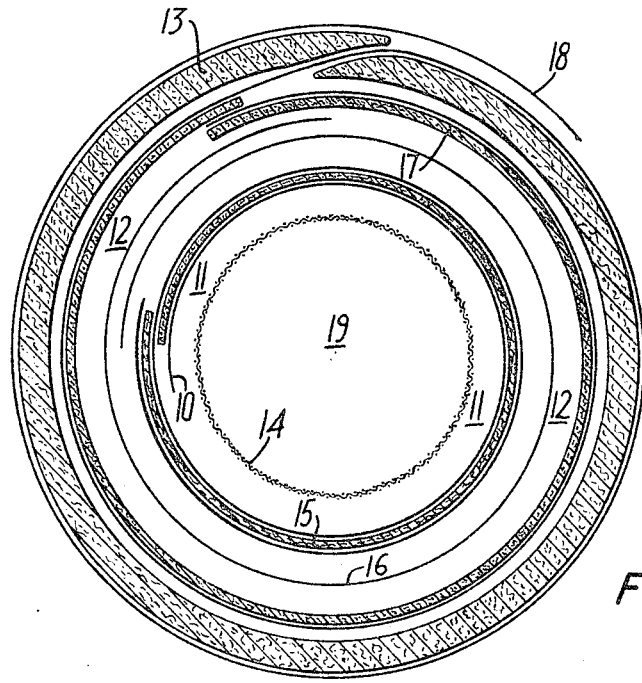
FIGURE 2 represents in cross-section a spirally wound cylindrical element useful as a coalescer or separator, depending upon the pore diameter.

The spirally-wound cylindrical coalescer of FIGURE 2 is prepared by laying down a slurry of diatomaceous earth and glass fibers upon an open mesh glass cloth 10. Fibers of different diameter are laid down on different sections of the cloth. In the first section 11 fine fibers having a diameter of approximately 0.25 micron and 12 inches long are laid down over a length of 11 inches. In the second section 12, which is 12 inches long, another lot of the same fine fibers is laid down. In the final section 13, which is 14 inches long, the coarsest layer of fiber, 20 microns in diameter, is laid down. The composite is rolled up on an aluminum wire mesh tube 14 as a mandrel, in the form of a cylinder. After winding layer 11, a spacer 15 is wound on, then a few wraps of micron fiber filter paper 16, then a spacer 17, then a few wraps of glass cloth 10 for reinforcing, and then layer 13 and a final wrap of resin-impregnated glass cloth 18. The result is shown in FIGURE 2. The wire mesh 14 is at center of the spiral, then the layer 11 of fine 0.25 micron fibers, next, the spacer 15, the micro fiber filter paper 16, the layer 12 of 0.25 micron fibers, the spacer 17, the layer 13 of 20 micron fibers, and the cover layer 18.

Liquid containing droplets to be separated enters the coalescer in the space 19 at the center of the wire mesh tube 14, and thence passes to the outside surface via layers 11, 15, 16, 12, 17, 13 and 18, the suspended droplets meanwhile being coalesced to large droplets by the time they emerge at the outside layer 15 of the coalescer.

Separator elements can be of the same construction as the coalescer of FIGURE 2, but only one fiber layer is needed, with the pore diameter less than that of layer 13.

Figure 3:
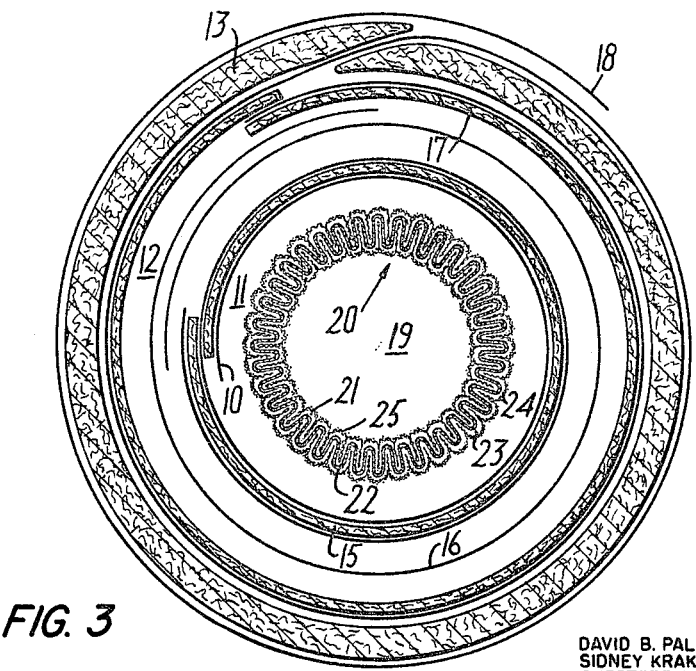
FIGURE 3 represents in cross-section another form of spiral cylindrical coalescer or separator element, incorporating a filtration stage therein.

The coalescer of FIGURE 3 differs from that in FIGURE 2 in having a corrugated tubular filter eleemnt 20 at the center instead of the wire mesh screen 14. This filter element also is of the depth type, and includes a layer 21 of fine high density 0.25 micron glass fibers, a layer 22 of resin-bonded 20 micron glass fibers compacted to a high density and a layer 23 of low density of 20 micron glass fibers, all enclosed within outer 24 and inner 25 tubes formed of wire mesh rolled so as to smooth the surface and somewhat reduce the pore diameter, and prepared in accordance with U.S. Patent No. 2,925,650. This element removes dirt and other debris from fluid entering at 19 before the coalescer stage is reached.

Figure 5:
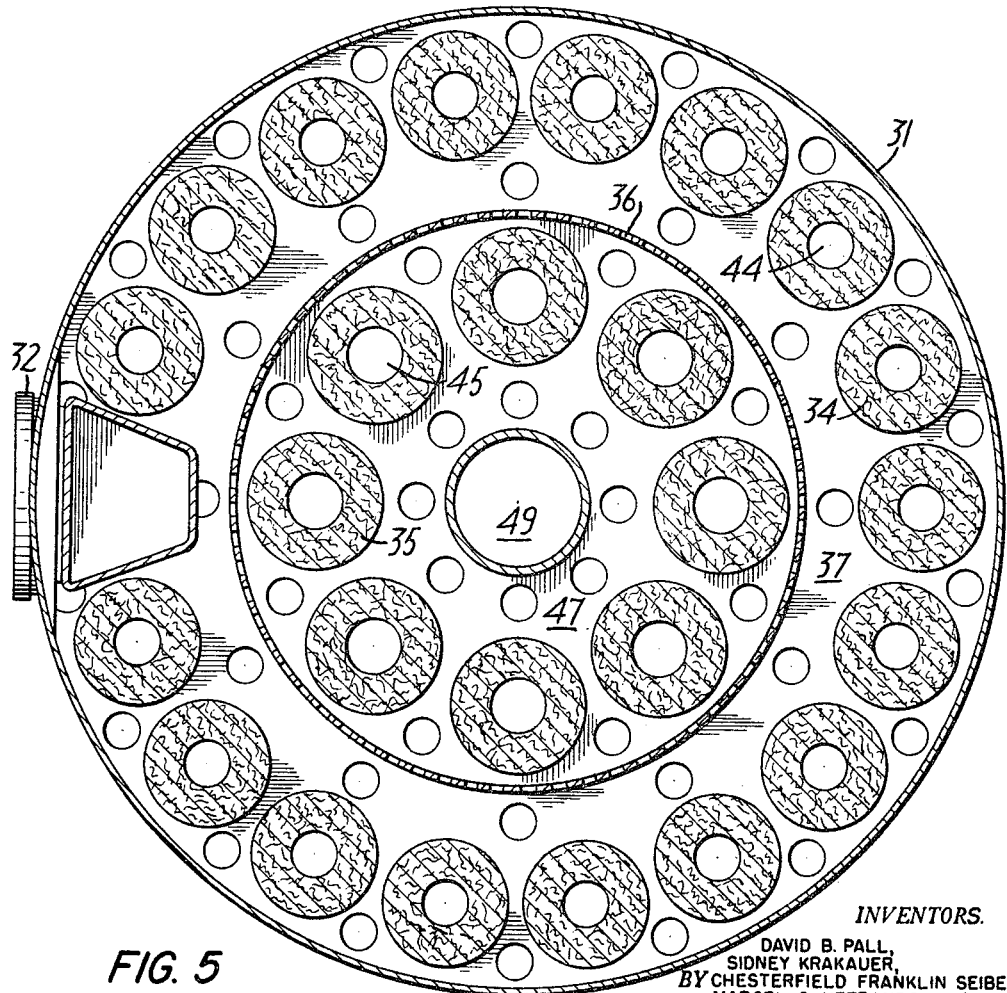
FIGURE 5 represents a cross-sectional view along the line 5—5 of the fuel-water separator of FIGURE 4.
Figure 4:
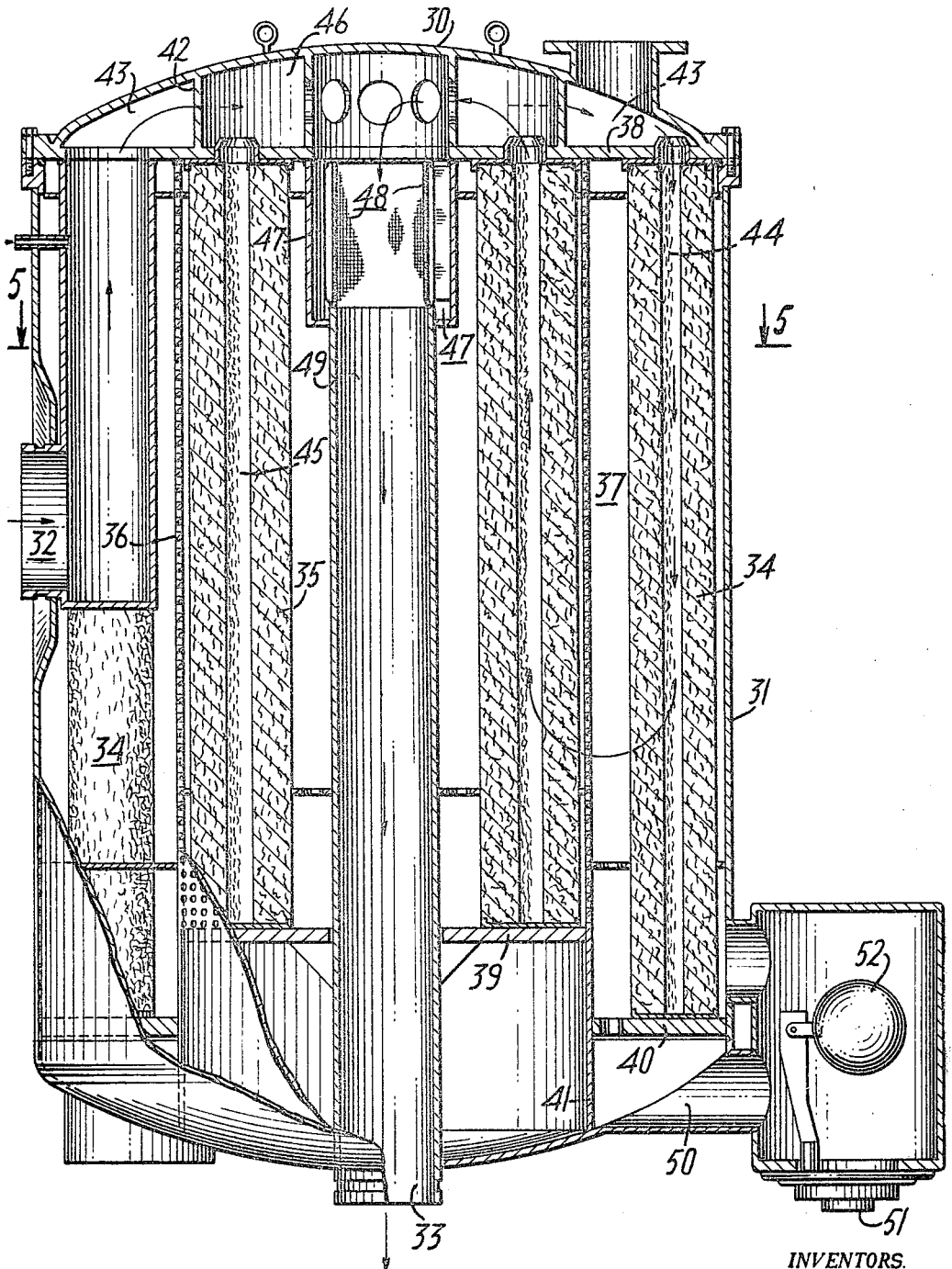
FIGURE 4 represents in side elevation, partly cut away, a fuel-water separator incorporating a plurality of the elements of FIGURE 2.

The apparatus of FIGURES 4 and 5 comprises a head portion 30 and a bowl portion 31. The bowl is provided with an inlet 32 and an outlet 33, as well as an array in two rows of cylindrical coalescers 34 and separators 35. The array of separators is enclosed by a perforated tube 36, placed in passage 37 between the coalescers and separators. The separators and coalescers are supported between top plate 38 and bottom plate 39 and 40, spaced apart by spacers 41, all gasketed (not shown) as required for leak-proofness. The passage 37 is provided with the drain pipe 50 and outlet 51. The outlet 51 is automatically controlled by the float valve 52.

The separators 35 are of the type shown in FIGURE 2, but have only one fiber layer, corresponding to layer 12. When the separators are to be used to separate water from fuel, their outer surface is coated with silicone resin, for water-repellency.

The circular baffle 42 in the head 30 defines an outer chamber 43 and an inner chamber 46. The chamber 43 connects the inlet 32 with the open passages 44 at the center of the coalescers 34. The similar passages 45 at the center of the separators 35 communicate with inner chamber 46 in the head, which in turn connects with the pot 47, in which is inserted a tubular sintered wire mesh filter element 48 in accordance with Patent No. 2,925,-650. The central passage enclosed by element 48 opens into the tube 49 which connects with outlet 33.

In operation, to separate water from fuel, for example, the coalescers 34 are preloaded by soaking in water-free fuel. Mixed fuel and water entering at the inlet 32 is directed by baffle 42 through the outer chamber 43 of the head 30 to the passages 44 of the coalescers 34, and passes through the coalescers into the passage 37, where the larger coalesced water droplets encountered the baffle 41 and separate out by gravity. The fuel passes through the baffle 41 to the separators 35. Any water droplets which pass through the baffle are separated at the surface of the separators, eventually being drained from passage 37 at 50 and 51. The fuel which passes through the separators enters the passages 45, and finally, directed by baffle 42, proceeds through passage 46 into the port 47, then through filter 48 and the tube 49 to emerge at the outlet 33.

It will be appreciated that the coalescers and separators can be arranged quite differently from that shown in FIGURES 4 and 5. While the coalescers and separators are best used in cylindrical form, in which the fuel passes from the center outwards in the coalescers, and from the outside inwards in the separators, it can follow a reverse path, from the outside inwards in the coalescer, and from the inside outwards in the separator. It is important only that the separator and coalescer be separated by a space in which the coalesced droplets can be collected.

The coalescers and separators can also be arranged in a tube in proper sequence, in the manner shown in FIGURE 1. It is also possible to form a spiral element of the type shown in FIGURES 2 and 3, in which the intermediate coarse layer 12 is replaced by an open space, with proper supports to hold layers 11 and 13 apart. The coalesced droplets can be collected in this space and removed, so that the portion 11 would serve as the coalescer, and the portion 13 as the separator. In this way, coalescer and separator are included in the same element.

Other variations will be apparent to those skilled in the art.

The mechanism by which coalescence occurs is not entirely clear, and has yet to be fully established. There are two possibilities:

(1) The walls of the coalescer passage are wet preferentially and coated with the continuous phase, i.e., the suspending liquid.

(2) The walls of the coalescer passage are wet preferentially and coated with the discontinuous phase, i.e., the suspended liquid.

In either case, it is believed that coalescence occurs as follows:

Since the suspended droplets are too large to pass through the coalescer passage, they tend to collect at the entrance thereto. As the fuel or other liquid flows through the passage, a mass of the droplets tends in time to gather at the entrance; the droplets in such a mass can and do consolidate or coalesce to form a larger droplet. As the droplet grows, it offers increasing resistance to entry of suspending fluid into the passage. At some point in the growth of the coalesced droplet, determined by its surface tension and the diameter of the passage, the pressure of suspending liquid against the droplet overcomes the interfacial tension of the droplet liquid, which tends to maintain the spherical configuration of the droplet, compressing the droplet and forcing it through the passage, to emerge on the other side as a large coalesced droplet. A droplet which is smaller than the opening can pass into it, but may become trapped in any passage on the other side. Oversize droplets passing through probably clean off any such droplets clinging to the walls of the passage, absorbing these as well.

This process results in substantially complete coalescence of the suspended liquid.

We claim:

1. A process for coalescing small droplets of immiscible liquid in a suspending liquid medium, comprising forcing the droplets through the passages of a compacted coalescer element formed of compacted layers of fibers having diameters within the range from about 0.25 to about 5 microns, and defining therebetween passages having diameters within the range from about 0.01 to about 5 microns, and less than that of the droplets.

2. A process in accordance with claim 1, in which the passage diameter is less than 2/3 the diameter of the droplets.

3. A process in accordance with claim 1, in which the coalescer element is a depth-type filter.

4. A process in accordance with claim 3, in which the depth-type filter is of fiber glass, containing diatomaceous earth interspersed therethrough.

5. A process in accordance with claim 1, which includes first filtering the liquid.

6. A process in accordance with claim 1, which includes separating the coalesced droplets by passing the suspending liquid through a passage whose diameter is within the range from about 5 to about 25 microns, and less than that of the coalesced droplets.

7. A process in accordance with claim 6, in which the surface of the separating passages are repellent to the droplet liquid.

8. An apparatus for coalescing and separating from a suspending liquid small droplets of another liquid immiscible therein, comprising a bowl and head portions, inlet and outlet passages therein, and disposed in the bowl a plurality of coalescers elements formed of a compacted layer, of fibers having diameters within the range from about 0.25 to about 5 microns, and defining therebetween passages having diameters within the range from about 0.01 to about 5 microns and less than the diameter of the droplets, and a plurality of separator elements having passages therethrough whose diameter is within the range from about 5 to about 25 microns and less than the diameter of droplets emerging from the coalescer elements, whereby the coalesced droplets are barred from entering the separators, the coalescers and separators being spaced by a passage for collection of coalesced droplets trapped therein by the separators, and means for withdrawing coalesced droplets from the collection passage.

9. An apparatus in accordance with claim 8, including a filter for separating suspended solid matter from the liquid before it reaches the coalescer elements.

References Cited by the Examiner
UNITED STATES PATENTS

| | | | |
|---|---|---|---|
| 2,523,793 | 9/1950 | Vance | 210—23 X |
| 2,611,490 | 9/1952 | Robinson | 210—23 X |
| 2,701,062 | 2/1955 | Robinson. | |
| 2,911,101 | 11/1959 | Robinson. | |
| 3,016,345 | 1/1962 | Price | 210—23 X |
| 3,098,108 | 7/1963 | Preiser | 208—299 X |
| 3,115,459 | 12/1963 | Giesse. | |

MORRIS O. WOLK, *Primary Examiner.*

E. G. WHITBY, *Assistant Examiner.*